Figure 1:
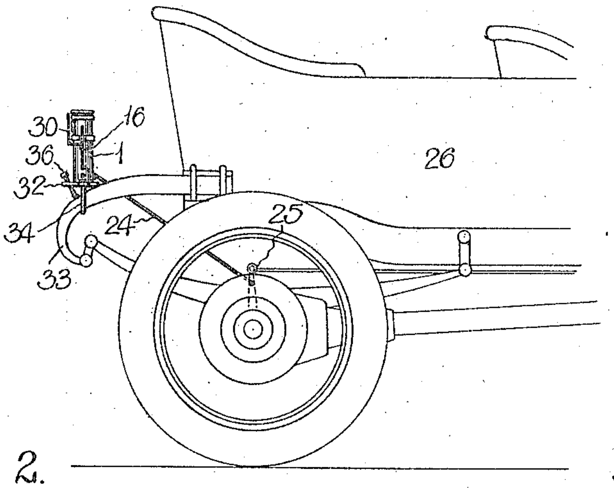

W. DRABOLD & A. P. MOTT.
AUTOMOBILE TRAFFIC SIGNAL.
APPLICATION FILED OCT. 30, 1914.

1,164,581. Patented Dec. 14, 1915.

Inventors
Walter Drabold,
Augustus P. Mott,

Witnesses
Chas. W. Stauffiger
Anna M. Dore.

By [signature]
Attorneys

NORRIS PETERS INC. LITHO. WASHINGTON, D. C.

UNITED STATES PATENT OFFICE.

WALTER DRABOLD AND AUGUSTUS P. MOTT, OF DETROIT, MICHIGAN.

AUTOMOBILE TRAFFIC-SIGNAL.

1,164,581. Specification of Letters Patent. Patented Dec. 14, 1915.

Application filed October 30, 1914. Serial No. 869,362.

*To all whom it may concern:*

Be it known that we, WALTER DRABOLD and AUGUSTUS P. MOTT, citizens of the United States of America, residing at Detroit, in the county of Wayne and State of Michigan, have invented certain new and useful Improvements in Automobile Traffic-Signals, of which the following is a specification, reference being had therein to the accompanying drawings.

This invention relates to automobile traffic signals, and the principal object of our invention is to provide a semaphorical signal which will indicate by day, as well as by night, to oncoming vehicles, the fact that the signal carrying vehicle is about to stop, reduce speed, or turn into another lane of travel.

Another object of our invention is to provide a novel bracket and clamp by which the signal can be easily and quickly connected to a vehicle spring.

A still further object of our invention is to provide a semaphorical signal that is automatically actuated when vehicle brakes are applied, thereby relieving the operator or chauffeur of a vehicle of the responsibility of operating the signal.

The above and additional objects are accomplished by a device that will be hereinafter specifically described and then claimed, and reference will now be had to the drawing, wherein—

Figures 2, 3, 4:
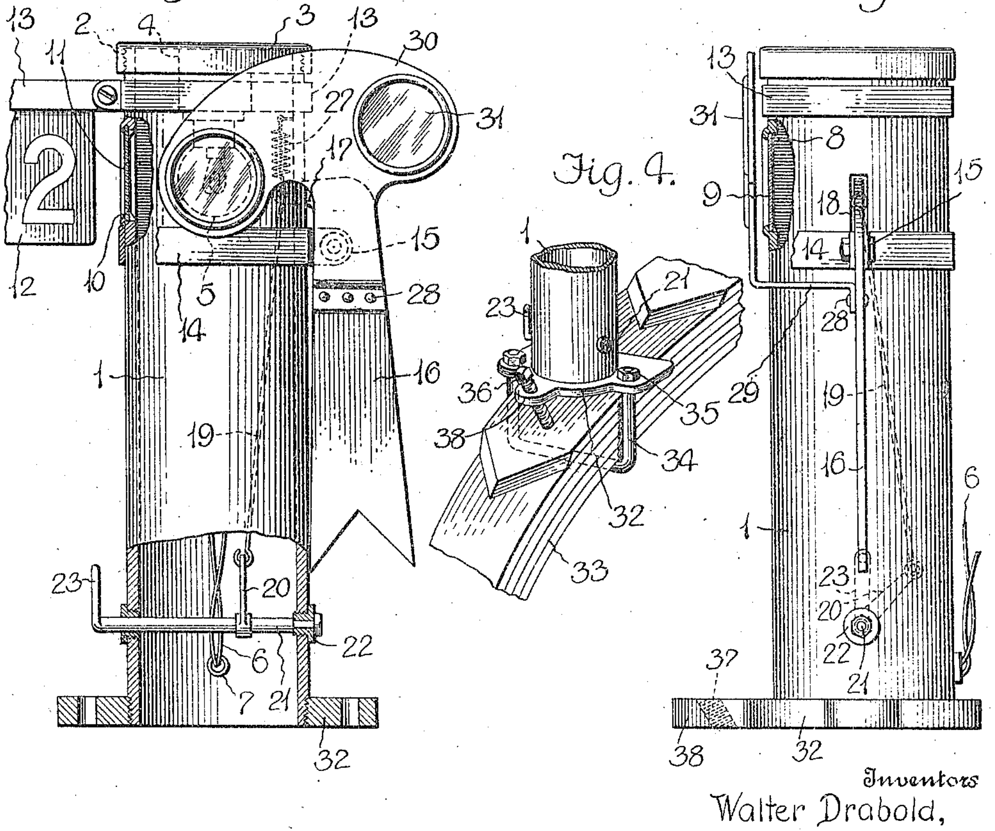

Figure 1 is a side elevation of a portion of an automobile provided with a signal in accordance with our invention; Fig. 2 is a front elevation of the signal partly broken away and partly in sections; Fig. 3 is a side elevation of the same, partly in section, and Fig. 4 is a perspective view of a bracket and clamp constituting means for connecting the signal to a spring or other support.

The signal comprises a tubular post or cylinder 1 having the ends thereof exteriorly screwthreaded, as at 2 and detachably mounted upon the upper end of the post or cylinder is a cap 3 provided with a depending socket 4 for an incandescent lamp 5, said lamp having electrical connections 6 extending through an opening 7 provided therefor in the post or cylinder. The electrical connections 6 are connected to a suitable source of electrical energy as batteries, carried by a vehicle. The incandescent lamp 5 constitutes illuminating means for the signal and the front side of the post or cylinder has an opening 8 closed by a transparent plate 9 to exclude dirt and foreign matter from the interior of the post or cylinder. The side of the post or cylinder has another opening 10 closed by a transparent plate 11 and this plate allows rays of light to be cast upon a license card or sign 12 connected to a holder 13 clamped upon the upper end of the post or cylinder. Another band or holder 14 is clamped upon the post or cylinder and affords a bearing 15 for a semaphore arm 16. The semaphore arm 16 has the inner end thereof provided with an apertured extension 17 that protrudes through a slot 18 in the side of the post or cylinder and said apertured extension is connected by a rod 19 to the crank 20 of a rock shaft 21. The rock shaft 21 is journaled in suitable bearings 22 provided therefor in the lower end of the post or cylinder and one end of said rock shaft has a crank 23 connected by a rod or cable 24 to a brake element 25 of an automobile 26. The apertured extension 17 is connected by a coiled retractile spring 27 to a wall of the post or cylinder, said spring preventing vibrations of the vehicle when in motion from shifting the semaphore arm 16.

Suitably connected to the front side of the semaphore arm 16, as at 28, is an angle bracket 29 terminating in a segment shaped lens holder 30, said holder having red and green lenses or bull's-eyes 31 adapted for parallel registration with the transparent plate 9, whereby red and green signals can be displayed at night.

The lower end of a post or cylinder 1 is mounted in a plate or bracket 32 and this plate or bracket is adapted to be secured to a rear spring 33 or suitable support forming part of the vehicle 26. As a fastening means for the plate or bracket 32 a yoke 34 is employed, said yoke embracing the spring and having the ends thereof extending through the plate 32 and provided with nuts 35. To correctly position the plate 32 and prevent accidental displacement of the same due to any action of the spring 33 an angularly disposed screw 36 is mounted in the plate or bracket 32 to engage the spring 33 and coöperate with the yoke 34 in supporting the plate or bracket in substantially a horizontal plane. The screw 36 is adjustably mounted in an angularly disposed opening 37 provided therefor in an extension 38 of the plate or bracket, as best shown in Fig. 4 and it is through the medium of this adjustable screw that the post or cylinder is retained in a vertical position contiguous to the rear end of the automobile body, without interfering with tire supports or other automobile accessories.

During the day the semaphore arm 16, when raised, indicates change of direction in travel or a cessation in the operation of the automobile and at night, a green light is displayed and normally indicates "safety" or "caution," but should there be a change in the operation of the automobile necessitating an application of the brake, the semaphore arm 16 is immediately raised and the red lens or bull's-eye shifted in front of the illuminating means of the signal to indicate "danger."

The license card 12 and the holder thereof can be dispensed with in some instances and the entire device finished to harmonize with the fittings of an automobile.

What we claim is:—

In a semaphoric signal for automobiles, the combination with a rear spring, of a bracket clamped thereon, adjustable means carried by said bracket and engaging said spring for positioning said bracket in a substantially horizontal plane, a post carried by said bracket, a visible signal at the upper end of said post, and means operatable at the lower end of said post for moving said signal.

In testimony whereof we affix our signatures in presence of two witnesses.

WALTER DRABOLD.
AUGUSTUS P. MOTT.

Witnesses:
ANNA M. DORR,
CHAS. W. STAUFFIGER.

Copies of this patent may be obtained for five cents each, by addressing the "Commissioner of Patents. Washington, D. C."